Patented Mar. 31, 1931

1,798,605

UNITED STATES PATENT OFFICE

SAMUEL P. HOWE, OF PINE VALLEY, CLEMENTON, NEW JERSEY

WOVEN FABRIC CONTAINING LEAD

No Drawing.   Application filed May 3, 1929. Serial No. 360,295.

My invention relates to woven fabric which is suitable for use as a clutch facing or other element adapted to receive frictional wear.

One feature of my invention consists in providing lead in the fabric. This is found to be most effective in doing away with the shudder set up at the time of change from friction of motion to static friction.

This lead may be introduced either in the form of thin lead wires, or as lead oleate or as lead linoleate.

The fabric may also contain mica if so desired.

This invention represents an improved form of invention in clutch facing material and process for its production for which I have applied for U. S. Letters Patent, Serial No. 325,669, filed December 12, 1928. My previous application discloses in general my method of preparing a fabric suitable for use as a clutch facing. In general be it said that this method consists in introducing ground and sifted mica in powdered form into finely shredded asbestos fibers. These fibers are then rubbed together to make threads. These threads are then taken and spun with a core of thin wire. Two or more of the threads so produced are twisted together to form a cord. From these cords the fabric, which is intended for use as a clutch facing, is woven.

In my present invention finely shredded asbestos fibers with or without mica are rubbed together to make threads. These threads are then taken and spun with a core of thin wire. I find as my present invention that this wire may advantageously be made of lead.

Also as part of my present invention I find that I may treat such threads composed of asbestos fiber and lead wire or wire of other suitable metal, such as brass, either with or without mica, with lead oleate or with lead linoleate. Two or more such threads, either before such treatment or after treatment with lead oleate or lead linoleate, are twisted together to form a cord and the cords woven into a fabric. This fabric, even if composed of untreated threads, may be used as a clutch facing. However, if this fabric is composed of untreated threads I may treat the finished fabric with lead oleate or with lead linoleate and then use the treated fabric as a clutch facing.

In the exercise of my invention I do not intend to be limited save as the scope of the prior art and the attached claims may require.

I claim:

1. A woven fabric containing lead oleate.
2. A clutch facing containing lead oleate.
3. A woven fabric containing lead oleate and metal wire.
4. A clutch facing containing lead oleate and metal wire.
5. A woven fabric containing mica and lead wire.
6. A clutch facing containing mica and lead wire.
7. A woven fabric containing mica, metal wire, and lead oleate.
8. A clutch facing containing mica, metal wire, and lead oleate.
9. A woven fabric containing mica, metal wire, lead oleate and asbestos fiber.
10. A clutch facing containing mica, metal wire, lead oleate and asbestos fiber.
11. A woven fabric containing a salt of lead and an acid of the oleic series.
12. A clutch facing containing a salt of lead and an acid of the oleic series.
13. A woven fabric containing a salt of lead and an acid of the oleic series, and lead wire.
14. A woven fabric containing a salt of lead and an acid of the oleic series, lead wire, and mica.
15. A woven fabric, containing a salt of lead and an acid of the oleic series, lead wire, mica, and asbestos fiber.
16. A woven fabric containing a salt of lead and a fatty acid.
17. A woven fabric containing a salt of lead and a fatty acid, and metal wire.
18. A woven fabric containing a salt of lead and a fatty acid, metal wire and mica.
19. A woven fabric containing a salt of lead and a fatty acid, metal wire, asbestos fiber, and mica.

SAMUEL P. HOWE.